3,554,773
PROCESS FOR INACTIVATING ENZYMES IN MEAT
TO BE STABILIZED BY RADIATION
Gary W. Shults, Milford, and Eugen Wierbicki, Framingham, Mass., assignors to the United States of America as represented by the Secretary of the Army
No Drawing. Filed Feb. 29, 1968, Ser. No. 709,188
Int. Cl. A23b 1/00
U.S. Cl. 99—217                   4 Claims

ABSTRACT OF THE DISCLOSURE

In a process for the radiation stabilization of fresh beef wherein the beef is first blanched to inactivate proteolytic enzymes and then stabilized with high energy ionizing radiation, the improvement which consists of increasing the salt content of beef to a level from between 0.5 to 1.5% by weight by pumping and/or marinating with a concentrated salt solution prior to blanching whereby the beef enzymes are rendered susceptible to inactivation at lower temperatures or the same temperature for shorter times than was heretofore possible.

---

The invention described herein may be manufactured, used, and licensed by or for the Government for governmental purposes without the payment to us of any royalty thereon.

This invention relates to a process for reducing the time-temperature relationship of blanching required to inactivate proteolytic enzymes normally present in fresh meat.

It has long been the goal of food technologists to stabilize meat in essentially its fresh state so that it may be held or stored for extended periods of time without requiring refrigeration. With high energy ionizing radiation, it has become possible to sterilize food items without cooking or causing any significant rise in the temperature of the item so sterilized. Sterilizing dosages of high energy ionizing radiation while destroying all of the microorganisms present in the fresh meat item do not inactivate all of the proteolytic enzymes normally found therein. Such enzymes contribute to the deterioration of meat on storage, such deterioration being characterized by a production of off-flavors and a degratdation of texture which stem from the induced hydrolysis of proteins and peptides. Thus far, at least, all attempts to develop a non-thermal method for inactivating proteolytic enzymes have not been successful. Heretofore, proteolytic enzymes have been completely inactivated by a thermal treatment, usually termed blanching, wherein in the case of beef, for example, it has usually been necessary to employ temperatures in excess of 70° C. While there is a time-temperature relationship involved in the denaturing or inactivation of enzymes, it is nonetheless generally agreed that an internal temperature of 70° C. must be reached in the meat product to destroy all proteolytic activity. However, at a temperature of 70° C., the meat proteins, especially the meat pigment protein myoglobin, has denatured. Since it is our object to produce a nearly fresh beef muscle product that can be stored indefinitely at room temperature, it is apparent that conventional blanching temperatures are not suitable.

It has been discovered that it is not possible to reduce the time-temperature relationship required to completely destroy the proteolytic enzymes in fresh beef. More particularly, we have found that by increasing the salt content of the beef to certain levels above that normally found in such products prior to the blanching step, it then becomes possible to completely inactivate proteolytic enzymes at a time-temperature relationship significantly below that which is normally required. The salt (chloride content of fresh beef is normally about 0.2%) by weight. In accordance with the present invention, we increase the salt content of beef to a level of 0.5% or higher and preferably within the range from about 0.5% to about 1.5%. The increase in salt content is effected by marinating or pumping beef portions in a high-concentration sodium chloride solution, e.g. 2% or higher.

In the laboratory, the enzymatic degradation of the beef samples is measured by chemical analysis to determine the changes in the nitrogenous constituents of the sample. The percent of non-protein nitrogen (NPN) to the total nitrogen is used as a guide to determine the amount of degradation on the storage. Determination of the non-protein nitrogen is based on the amount of nitrogen obtained in an aliquot of a trichlorocetic acid filtrate.

The blanching and irradiation sterilization steps are well known to those skilled in the art. Blanching, for example, is accomplished by placing the samples in a water impermeable package and immersing in a hot water bath for a specified interval of time. Sterilization is accomplished by exposing the samples to sterilizing dose of high energy ionizing radiation. High energy ionizing radiation used in the sterilization of food stuffs has energy levels that range from 750,000 electron volts to about 10,000,000 electron volts. The types of ionizing radiation that may be employed are known in the art and may include, for example, electron beams, gamma rays and X-rays. It is preferred that the energy level of the ionizing radiation be less than 12,000,000 electron volts in order to avoid any possibility of inducing radioactivity in the food items so treated. Sterilization of food stuffs requires dosages of the ionizing radiation in the range of approximately 3.0 to about 5.6 megarads. Rad is a unit of absorbed dose of ionizing radiation equal to an energy of 100 ergs per gram of irradiated material.

Irradiation of the food items described in the following example was accomplished by exposing the items to gamma radiation from a 900,000 curie cobalt 60 source. The physical arrangement of the source consisted of two spaced apart parallel plaques which contain the radio isotope. Samples are placed in stacked aluminum canisters and carried by conveyor between the plaques for a period of time necessary to reach the desired dosage level.

EXAMPLE 1

U.S. choice beef loins, the *Longissimus dorsi* muscle, 7 days after slaughter were sliced into one-half inch steaks. One-half of the steaks were marinated in a 4% sodium chloride solution and allowed to soak for 24 hours at 5° C. All the steaks were then packaged in water-tight flexible pouches and blanched by heating in a water bath to internal temperatures of 65° C. or 71° C. 15 to 17 minutes were required before the internal temperature of the steaks reached the temperature of the water bath. The steaks were held at the designated internal temperatures for certain specified intervals of time. After blanching, the steak samples were placed in an ice water bath to rapidly cool the contents. The steaks were removed from the pouches and hermetically sealed at twenty-five inches of vacuum in metal containers. The canned samples were then irradiated at a controlled temperature of −50° C. to a dose range of 4.5 to 5.6 megarads.

The steaks were then analyzed at "0 months" and "3 months" of storage at 21° C. for increases in the non-protein nitrogen values (NPN). Previous work has shown that enzymes will start deteriorating the product within three months of storage. The NPN values are used as an indication of proteolytic enzyme activity and are expressed as percentages for the total nitrogen calculated for the meat samples. The following table illustrates the NPN values of the various samples. An NPN value above 8 is considered to demonstrate proteolytic activity. Samples 1–7 inclusive were of normal fresh beef and samples 8–14 inclusive were of fresh beef whose salt level had been increased to the values indicated.

TABLE.—PERCENT OF NPN TO TOTAL NITROGEN

| | Temperature, °C. | Time, minutes | 0 month | 3 months | 12 months | Percent salt by weight (approx.) |
|---|---|---|---|---|---|---|
| 1 | 65 | 10 | 9 | 12 | 16 | 0.2 |
| 2 | 65 | 20 | 9 | 11 | | 0.2 |
| 3 | 65 | 30 | 8 | 10 | 13 | 0.2 |
| 4 | 65 | 60 | 9 | 9 | 9 | 0.2 |
| 5 | 71 | 5 | 8 | 8 | 8 | 0.2 |
| 6 | 71 | 10 | 8 | 9 | 7 | 0.2 |
| 7 | 71 | 15 | 7 | 8 | 7 | 0.2 |
| 8 | 65 | 10 | 7 | 8 | | 0.8 |
| 9 | 65 | 20 | 6 | 7 | | 0.6 |
| 10 | 65 | 30 | 6 | 7 | | 0.6 |
| 11 | 65 | 60 | 6 | 7 | | 0.8 |
| 12 | 71 | 5 | 6 | 7 | | 1.0 |
| 13 | 71 | 10 | 6 | 7 | | 1.0 |
| 14 | 71 | 15 | 6 | 7 | | 0.9 |
| 15 | 77 | ¹1 | 7 | 8 | | 0.2 |

¹ Non-irradiated control.

The results in the above table indicate that the inactivation time and temperature for proteolytic enzymes in beef steaks can be reduced from 60 minutes at 65° C. to less than 10 minutes at 65° C. in the case of beef samples whose salt content has been increased above 0.6% by weight. The results further indicate that the enzyme inactivation at 65° C. in the case of beef with added salt is as efficient as the enzyme inactivation at 71° C. in salt-free beef. This reduction in the holding time required at 65° C. or in decreasing the temperature from 71° C. to 65° C. are considerable improvements in the blanching operation. The long holding time (60 minutes) required in the case of the unsalted beef samples at 65° C. normally precludes the use of this temperature level for blanching purposes. In the case of the salted samples, the reduction in time is of such magnitude that 65° C. becomes a feasible temperature at which to accomplish the blanching operation. By using the blanching temperature of 65° C., instead of 71° C. (which is feasible time-wise in case of beef with added salt) the resulting product contains more natural juices and more closely resembles fresh beef, colorwise.

It can be seen, therefore, that by increasing the salt content of fresh beef from its normal level of 0.2% by weight to a level ranging from 0.5% to about 1.5% by weight, it is possible to completely inactivate proteolytic enzymes at lower temperatures than heretofore employed or for shorter times at temperatures conventionally employed. This reduction in the time-temperature requirements of the blanching step significantly reduces the cooking shrink and denaturing of proteins by thermal treatment and as a consequence when the blanched beef muscle is subsequently sterilized by high energy ionizing radiation, there results a food product which is comparable to fresh beef after preparation for table use and which can be stored without refrigeration or any special temperature requirement for extended periods of time.

It will be understood that the above embodiments of the invention are illustrative only and that modifications will occur to those skilled in the art. The invention, therefore, is not to be limited to the specific examples disclosed herein but is to be defined by the claims.

We claim:
1. In a process for preservation of fresh beef wherein the beef is blanched to inactivate proteolytic enzymes and subsequently sterilized with high energy ionizing radiation, the improvement that permits a reduction in the time-temperature requirements of the blanching step below that normally required to inactivate said enzymes which comprises increasing the sodium chloride content of the beef to a level from about 0.5% to about 1.5% by weight prior to blanching.

2. The process according to claim 1 wherein the beef is marinated or pumped with an aqueous solution containing at least 2% by weight of sodium chloride.

3. The process according to claim 2 wherein the salt solution contains 4% sodium chloride by weight.

4. The process according to claim 3 wherein the beef is blanched by holding at a temperature of 65° C. for at least 10 minutes.

References Cited

UNITED STATES PATENTS 3,093,489  6/1963  Alexander et al. _____ 99—217
3,401,044  9/1968  Corlett et al. _____ 99—217

OTHER REFERENCES

Heiligman, "Storage Stability of Irradiated Meats," Food Technology, July 1965, pp. 114–115.

Erdman et al., "Radiation Preservation of Cured Meats," Food Technology, July 1957, pp. 349–353.

Beatty, "The Method of Enzyme Action," 1917, J&A Churchill-London, p. 50.

Anderson, "Enzymes and Their Role in Wheat Technology," 1946, Interscience Publishers Inc., New York, p. 6.

JOSEPH M. GOLIAN, Primary Examiner

U.S. Cl. X.R.

99—157